(12) United States Patent
Sakakibara et al.

(10) Patent No.: US 11,510,126 B2
(45) Date of Patent: Nov. 22, 2022

(54) COMMUNICATION APPARATUS AND COMMUNICATION SYSTEM FOR COMMUNICATION IN A SITUATION WHERE BROADCAST IS RECEIVED

(71) Applicant: Panasonic Intellectual Property Management Co., Ltd., Osaka (JP)

(72) Inventors: Tatsuhito Sakakibara, Kanagawa (JP); Hajime Shimada, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 108 days.

(21) Appl. No.: 17/150,554

(22) Filed: Jan. 15, 2021

(65) Prior Publication Data

US 2021/0227441 A1 Jul. 22, 2021

(30) Foreign Application Priority Data

Jan. 20, 2020 (JP) .............................. JP2020-006822

(51) Int. Cl.
*H04W 36/30* (2009.01)
*H04W 72/04* (2009.01)
*H04W 36/06* (2009.01)

(52) U.S. Cl.
CPC ......... *H04W 36/305* (2018.08); *H04W 36/06* (2013.01); *H04W 72/0453* (2013.01)

(58) Field of Classification Search
CPC .......................... H04W 36/305; H04W 36/06; H04W 72/0453

USPC ......................................................... 370/331
See application file for complete search history.

(56) References Cited

U.S. PATENT DOCUMENTS

| | | | | |
|---|---|---|---|---|
| 2015/0274062 | A1* | 10/2015 | Wen | G07C 5/008 340/425.5 |
| 2019/0356214 | A1* | 11/2019 | Okubo | H02M 7/537 |
| 2020/0374007 | A1* | 11/2020 | Tanaka | H04L 12/403 |

FOREIGN PATENT DOCUMENTS

| | | | |
|---|---|---|---|
| JP | 2006-094650 | 4/2006 | |
| JP | 4635541 | 2/2011 | |
| WO | WO-2009147777 A1 * | 12/2009 | ............. H04B 15/04 |

* cited by examiner

*Primary Examiner* — Faisal Choudhury
(74) *Attorney, Agent, or Firm* — Greenblum & Bernstein, P.L.C.

(57) ABSTRACT

A master communication apparatus communicates with a slave communication apparatus. A communication interface communicates with the slave communication apparatus. A receiving interface receives information on a first frequency of a station selected by a receiver of broadcast. When a difference between the first frequency included in the information received by the receiving interface and a second frequency of a communication rate used in communication with the slave communication apparatus is smaller than a threshold value, the communication interface changes the communication rate to a third frequency different from the second frequency. When the communication interface changes the communication rate from the second frequency to the third frequency, the communication interface transmits change information indicating a change to the third frequency to the slave communication apparatus.

13 Claims, 8 Drawing Sheets

COMMUNICATION APPARATUS AND COMMUNICATION SYSTEM FOR COMMUNICATION IN A SITUATION WHERE BROADCAST IS RECEIVED

BACKGROUND

1. Field

The present disclosure relates to communication technology and, more particularly, to a communication apparatus and a communication system for communication in a situation where the broadcast is received.

2. Description of the Related Art

When a stepping motor is used in a device mounted in a vehicle, interference from the switching noise emitted from the stepping motor with a radio receiver mounted in the same vehicle degrades the reception quality. To prevent this, a determination is made as to whether the basic control frequency of the stepping motor should or should not be spread, based on information on a channel selected in the receiver (see, for example, patent literature 1).

{Patent literature 1} JP2006-94650

A plurality of devices mounted in a vehicle are communicably connected by a vehicle-mounted network. If the frequency of the communication rate in the vehicle-mounted network overlaps the channel being received in the receiver, the frequency of the communication rate interferes with the receiver so that the reception quality is degraded.

SUMMARY

The disclosure addresses the above-described issue, and a general purpose thereof is to provide a technology of suppressing the impact on the reception of broadcast.

A communication apparatus according to an embodiment of the present disclosure is a master communication apparatus communicating with a slave communication apparatus and includes a communication interface that communicates with the slave communication apparatus and a receiving interface that receives information on a first frequency of a station selected by a receiver of broadcast. When a difference between the first frequency included in the information received by the receiving interface and a second frequency of a communication rate used in communication with the slave communication apparatus is smaller than a threshold value, the communication interface changes the communication rate to a third frequency different from the second frequency. When the communication interface changes the communication rate from the second frequency to the third frequency, the communication interface transmits change information indicating a change to the third frequency to the slave communication apparatus.

Another embodiment of the present disclosure relates to a communication system. The communication system includes a master communication apparatus and a slave communication apparatus that communicates with the master communication apparatus. The master communication apparatus includes: a communication interface that communicates with the slave communication apparatus; and a receiving interface that receives information on a first frequency of a station selected by a receiver of broadcast. When a difference between the first frequency included in the information received by the receiving interface and a second frequency of a communication rate used in communication with the slave communication apparatus is smaller than a threshold value, the communication interface changes the communication rate to a third frequency different from the second frequency. When the communication interface changes the communication rate from the second frequency to the third frequency, the communication interface transmits change information indicating a change to the third frequency to the slave communication apparatus, and, when the slave communication apparatus receives the change information from the master communication apparatus, the slave communication apparatus uses the third frequency of the communication rate.

Optional combinations of the aforementioned constituting elements, and implementations of the disclosure in the form of methods, apparatuses, systems, recording mediums, and computer programs may also be practiced as additional modes of the present disclosure.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which.

DETAILED DESCRIPTION

The invention will now be described by reference to the preferred embodiments. This does not intend to limit the scope of the present invention, but to exemplify the invention.

A brief summary will be given before describing the present disclosure in specific details. An embodiment of the present disclosure relates to a communication system for communication between devices in a vehicle in which a receiver for receiving the broadcast such as radio broadcast is mounted. The receiver receives a predetermined channel in the broadcast such as radio broadcast. Further, cables are used for communication between devices in the communication system. If the frequency of the noise emitted from a cable is included in the aforementioned channel, the noise affects the receiver. This may make the noise and the target noise heard at the same time when the radio broadcast is received. In the related art, Controller Area Network (CAN) is often used in the communication system in a vehicle. In the case the noise that affects the receiver is being generated, it is useful to change the frequency of the communication rate. In CAN, however, the frequency can be changed only in units of several MHz, and the communication capacity is lowered by lowering the frequency by several MHz.

In the communication system according to this embodiment, Ethernet (registered trademark) is used instead of CAN. In the communication scheme of Ethernet (registered trademark), communication is performed only between communication interfaces called Physical (PHY) layer interfaces, and it is possible to finely regulate the frequency of the communication rate of the Ethernet (registered trademark) BUS using PHY. For example, the frequency is finely regulated by shifting the frequency by an amount commensurate with a separation between adjacent channels of the broadcast such as radio broadcast. For this reason, it is possible to finely regulate the frequency of the communication rate to counter the noise. In Ethernet (registered trademark), however, the frequency of the communication rate could change during communication. For this reason, even if the frequency that reduces the impact to the receiver is set, the frequency may be returned by other device(s) to the original frequency that affects the receiver. To address this, information indicating a change in the frequency is appended to a communication frame when the frequency is changed.

Figure 1:
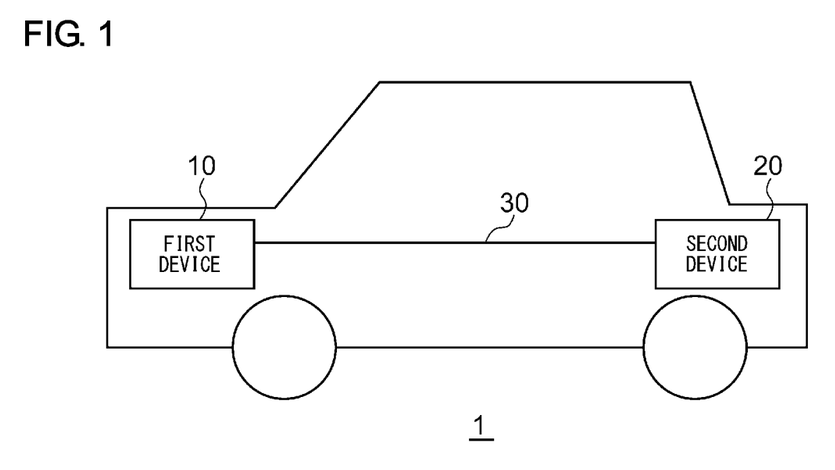
FIG. 1 shows a configuration of a vehicle according to the embodiment.

FIG. 1 shows a configuration of a vehicle 1. A first device 10, a second device 20, and a cable 30 are mounted in the vehicle 1. The first device 10 is a display apparatus including the radio reception function and is mounted toward the front of the vehicle 1. The second device 20 is exemplified by an imaging apparatus such as a rear camera and is mounted toward the back of the vehicle 1. The first device 10 and the second device 20 are connected by the cable 30 and can communicate with each other. For example, the second device 20 takes an image and transmits the image to the first device 10 via the cable 30. The first device 10 receives the image from the second device 20 via the cable 30 and displays the image on a monitor. The first device 10 is not limited to a display apparatus including the radio reception function, and the second device 20 is not limited to an imaging apparatus. Further, the number of devices mounted in the vehicle 1 and communicably connected to the cable 30 may be larger than "2".

Figure 2:
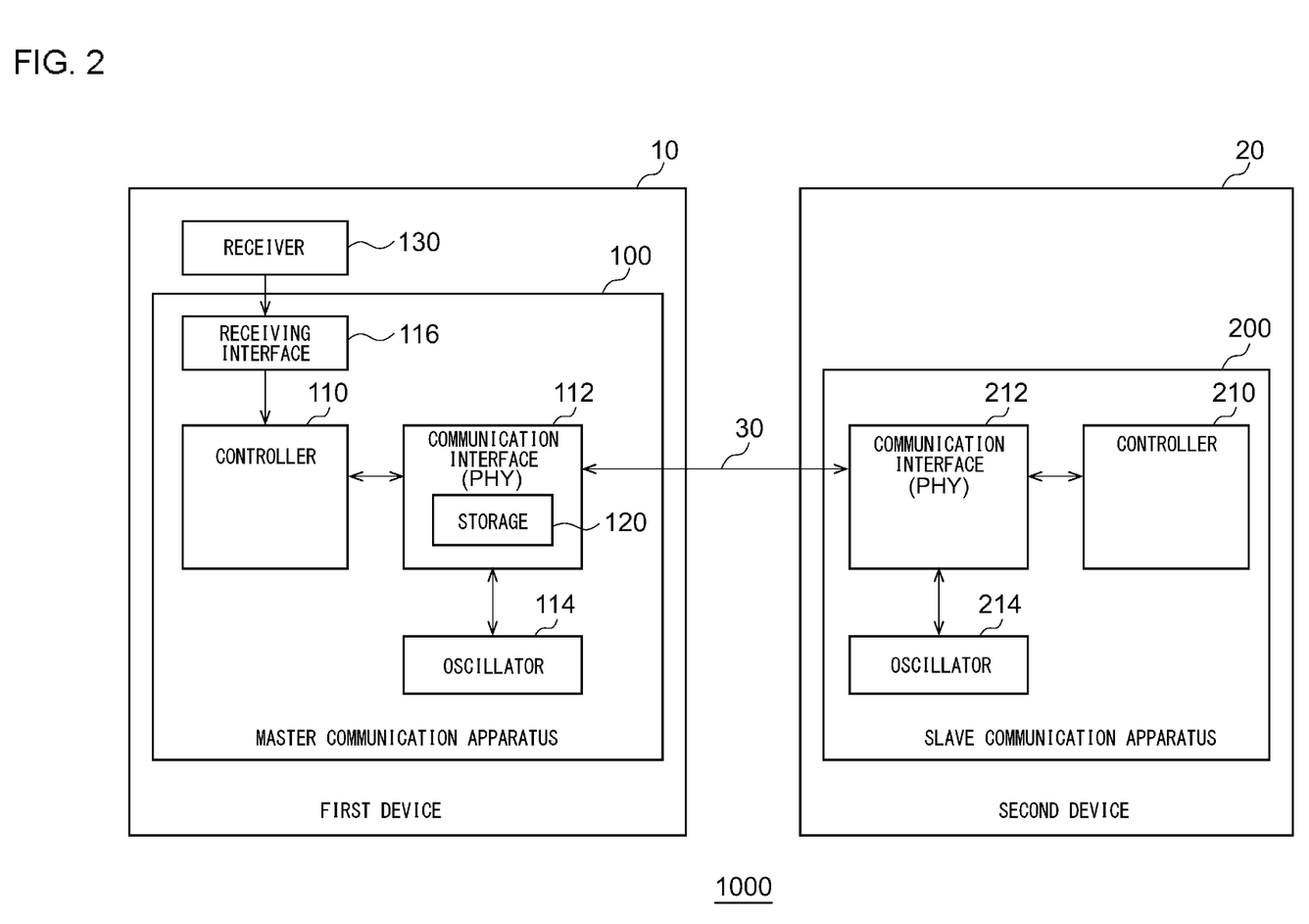
FIG. 2 shows a configuration of the communication system of FIG. 1.

FIG. 2 shows a configuration of the communication system 1000. The communication system 1000 includes the cable 30, a master communication apparatus 100, and a slave communication apparatus 200. The master communication apparatus 100 is included in the first device 10, and the slave communication apparatus 200 is included in the second device 20. The first device 10 also includes a receiver 130. The master communication apparatus 100 includes a controller 110, a communication interface 112, an oscillator 114, and a receiving interface 116. The communication interface 112 includes a storage 120. The slave communication apparatus 200 includes a controller 210, a communication interface 212, and an oscillator 214.

The receiver 130 receives the broadcast such as radio broadcast. In the broadcast, a plurality of channels are arranged at the separations of 100 kHz, and the receiver 130 selects and receives one of the channels. This means that the separation between adjacent channels in the broadcast is 100 kHz. When a seek stop is performed or when a signal of a level equal to or greater than the seek sensitivity is received during preset station selection, the receiver 130 outputs information on the selected channel (hereinafter, "station selection information") to the master communication apparatus 100, to cause the master communication apparatus 100 to determine the frequency of the communication rate. Defining the carrier frequency of the selected channel as the first frequency, the station selection information includes information on the first frequency.

Figure 3:
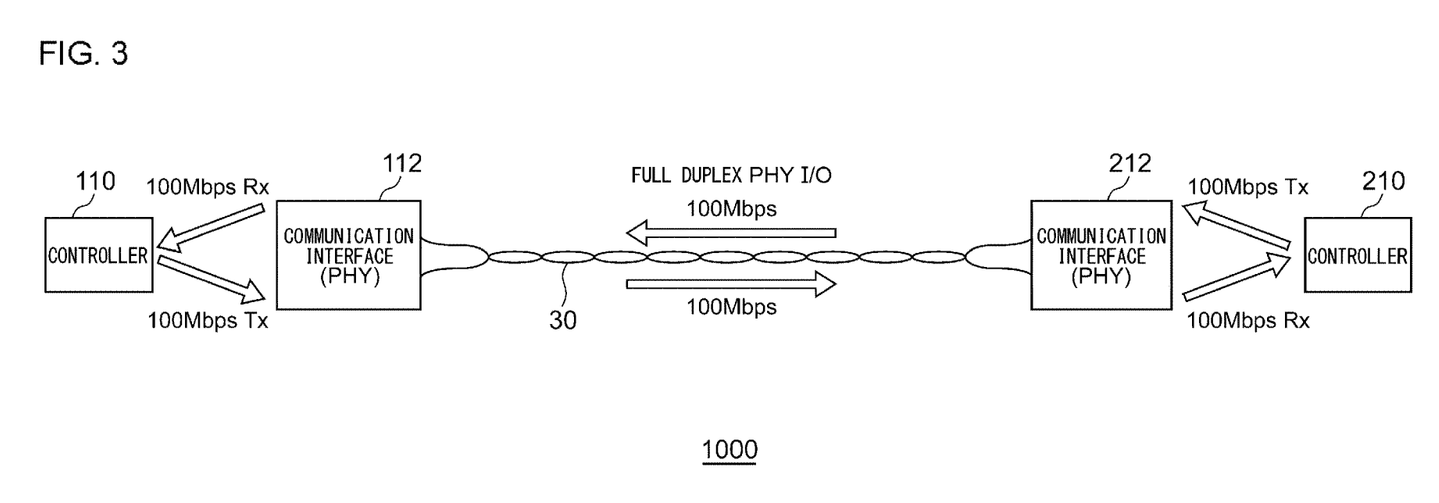
FIG. 3 shows a configuration of the communication system of FIG. 2.

The master communication apparatus 100 communicates with the slave communication apparatus 200 via the cable 30. FIG. 3 shows a configuration of the communication system 1000. FIG. 3 shows the cable 30, the controller 110, the communication interface 112, the controller 210, and the communication interface 212, among the components of FIG. 2. The controller 110 and the controller 210 perform a process on the Medium Access Control (MAC) layer or above, and the communication interface 112 and the communication interface 212 perform a process on the PHY layer. The controller 110 transmits (Tx) signals to the communication interface 112 at 100 Mbps, and the communication interface 112 transmits signals to the communication interface 212 at 100 Mbps via the cable 30 formed by a twist pair. The communication interface 212 receives signals from the communication interface 112, and the controller 210 receives (Rx) signals from the communication interface 212 at 100 Mbps. Meanwhile, the controller 210 transmits (Tx) signals to the communication interface 212 at 100 Mbps, and the communication interface 212 transmits signals to the communication interface 112 at 100 Mbps via the cable 30. The communication interface 112 receives signals from the communication interface 212, and the controller 110 receives (Rx) signals from the communication interface 112 at 100 Mbps. Full-duplex communication is performed over the cable 30.

Figure 4A:
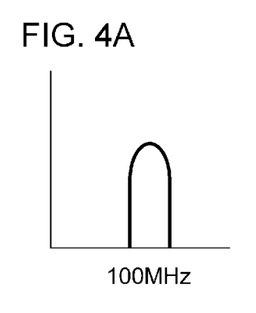
FIGS. 4A-4E show an outline of the process performed by the communication system of FIG. 2.
Figure 4B:
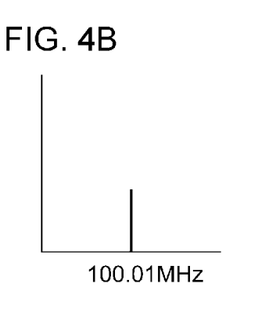

FIGS. 4A-4E show an outline of the process performed by the communication system 1000. FIG. 4A shows a spectrum of a signal received by the receiver 130, i.e., of a signal of the selected channel. By way of one example, the first frequency for the channel is "100 MHz". FIG. 4B shows the frequency (hereinafter, "second frequency") of the communication rate used in communication between the master communication apparatus 100 and the slave communication apparatus 200 via the cable 30. By way of one example, the second frequency is "100.01 MHz".

Figure 4C:
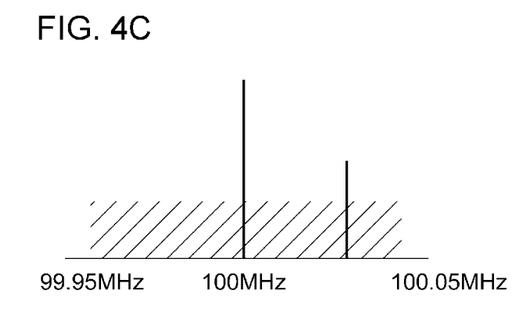

FIG. 4C is derived from combining FIG. 4A and FIG. 4B. The bandwidth of the signal of the selected channel is 100 kHz so that the spectrum of the signal of the selected channel occupies a range around 100 MHz between 99.95 MH and 100.05 MHz. Thus, the second frequency of 100.01 MHz is located in the spectrum of the signal of the selected channel so that the receiver 130 is affected by the interference by the signal at the second frequency. In such a case, the sound reproduced in the receiver 130 will contain the noise. FIGS. 4A-4E will be discussed later to explain a process of determining the frequency of the communication rate for reducing the impact from the interference by the signal at the second frequency. Reference is made back to FIG. 2.

The receiving interface 116 of the master communication apparatus 100 receives the station selection information from the receiver 130. The receiving interface 116 outputs the station selection information to the controller 110. The controller 110 outputs the station selection information received from the receiving interface 116 to the communication interface 112. The storage 120 of the communication interface 112 is exemplified by a Random Access Memory (RAM) and stores information on the first frequency included in the station selection information. The storage 120 also stores information on the second frequency of the communication rate of the communication interface 112.

The communication interface 112 compares the first frequency stored in the storage 120 with the second frequency. When the difference between the first frequency and the second frequency is equal to or larger than a threshold value, the communication interface 112 determines to maintain the second frequency. The threshold value is smaller than the separation between adjacent channels in the broadcast and is, for example, 50 kHz. When the difference between the first frequency and the second frequency is smaller than the threshold value, the communication interface 112 changes the communication rate to the third frequency different from the second frequency. The difference between the second frequency and the third frequency is equal to or larger than the separation between adjacent channels in the broadcast. For example, the third frequency is configured to be lower than the second frequency by 100 kHz. This is equivalent to shifting the frequency by an amount commensurate with a separation adjacent channels.

The oscillator 114 is exemplified by an external crystal oscillator and an external clock oscillator. The oscillator 114 generates an oscillation signal having a desired frequency by frequency division and outputs the oscillation signal to the communication interface 112. In that process, the oscillator 114 regulates the proportion in frequency division so that the frequency of the communication rate used in the communication interface 112 (e.g., the second frequency, the third frequency) results.

The communication interface 112 performs communication with the slave communication apparatus 200 by using the frequency of the communication rate determined, i.e., the oscillation signal received from the oscillator 114. Similarly, the oscillator 214 in the slave communication apparatus 200 generates an oscillation signal having a desired frequency and outputs the oscillation signal to the communication interface 212. The communication interface 212 uses the oscillation signal received from the oscillator 214 to communicate with the master communication apparatus 100. Thus, the communication interface 212 may use the second frequency, even if the communication interface 112 uses the third frequency. Use of the second frequency by the communication interface 212 affects the receiver 130. To prevent the occurrence of such a situation, the communication interface 112 includes change information (hereinafter, "frequency change flag") indicating a change to the third frequency in a signal (e.g., a communication frame) and transmits the signal to the slave communication apparatus 200, when the communication interface 112 changes the communication rate from the second frequency to the third frequency. For example, the frequency change flag is set to "1" when the frequency is changed to the third frequency, and the frequency change flag is set to "0" when the frequency is not changed to the third frequency. Further, the frequency change flag is maintained to be "1" over a period of time for which the communication interface 112 continues to use the third frequency.

Figure 5:
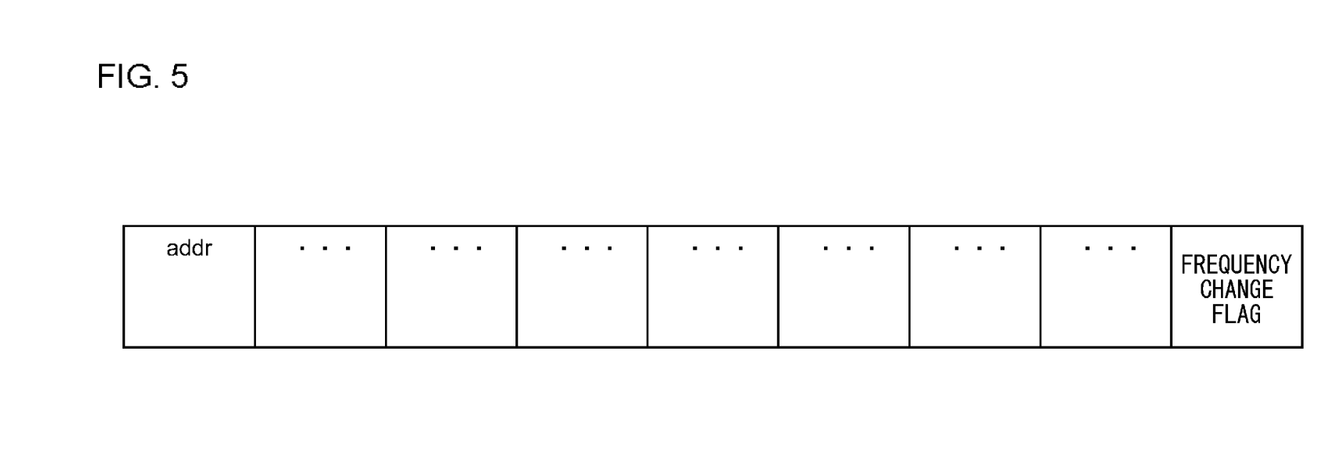
FIG. 5 shows a format of a header used in the communication system of FIG. 2.

FIG. 5 shows a format of a header used in the communication system 1000. The header is provided in the forward part of a communication frame. The header stores a plurality of types of information such as addr (address). The frequency change flag represents one of the plurality of types of information. Reference is made back to FIG. 2. The communication interface 212 of the slave communication apparatus 200 receives a signal from the master communication apparatus 100 via the cable 30. The communication interface 212 extracts the frequency change flag from the header of the signal and checks the content of the frequency change flag. When the frequency change flag is "0", the communication interface 212 fixes the frequency to the second frequency for use. Alternatively, the communication interface 212 may switch between the second frequency and the third frequency as desired and use the selected frequency. When the frequency change flag is "1", on the other hand, the communication interface 212 determines to use the third frequency of the communication rate. In particular, the third frequency of the communication rate is used in reception and transmission in the communication interface 212. The oscillator 214 performs frequency division determined by the frequency determined in the communication interface 212. The master communication apparatus 100 starts the process of determining the frequency of the communication rate immediately after the station selection in the receiver 130. The process of determining the frequency of the communication rate is completed within a mute period after the station selection.

Figure 4D:
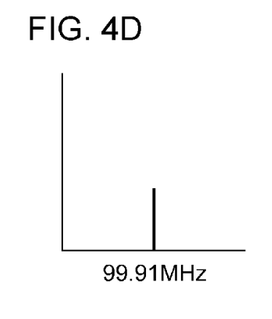
Figure 4E:
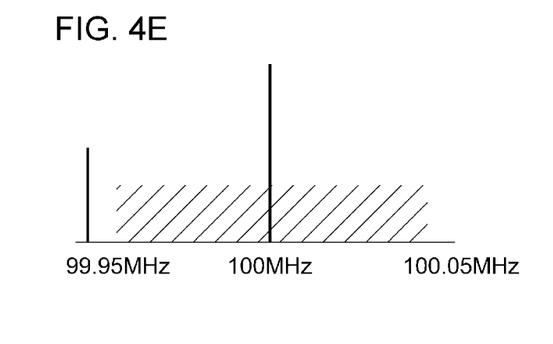

When the situation as shown in FIG. 4C could occur as a result of the process of determining the frequency of the communication rate, the third frequency of the communication rate as shown in FIG. 4D is used instead of the frequency as shown in FIG. 4B. In this case, the third frequency is "99.91 MHz". FIG. 4E is derived from combining FIG. 4A and FIG. 4D. As shown in the figure, the third frequency of 99.91 MHz is located within the spectrum of the signal of the selected channel. Therefore, the impact from the interference by the signal at the third frequency is reduced in the receiver 130. Reference is made back to FIG. 2.

The following process may be added to the process of determining the frequency of the communication rate. The storage 120 stores a condition according to which the communication rate should be changed from the second frequency to the third frequency. A list of the frequencies of channels selected by the receiver 130 for which channels the communication rate should be changed from the second frequency to the third frequency is shown to indicate the condition for a change. When the first frequency included in the station selection information received by the receiving interface 116 is included in the condition stored in the storage 120, the communication interface 112 determines to change the communication rate to the third frequency.

Subsequent to the process described above, the receiver 130 selects a channel (hereinafter, "new channel") different from the channel already selected. The carrier frequency of the new channel is the fourth frequency different from the first frequency. The receiver 130 outputs the station selection information to the master communication apparatus 100. The station selection information includes information on the fourth frequency.

The receiving interface 116 of the master communication apparatus 100 outputs the station selection information received from the receiver 130 to the controller 110, and the controller 110 outputs the station selection information received from the receiving interface 116 to the communication interface 112. The storage 120 of the communication interface 112 stores the information on the fourth frequency included in the station selection information. In the case the communication interface 112 receives the station selection information including the information on the fourth frequency while the communication rate is being switched to the third frequency, the communication interface 112 returns the communication rate to the second frequency and causes the storage 120 to store the information on the second frequency of the communication rate. In the case the communication interface 112 receives the station selection information including the information on the fourth frequency while the communication rate is being the second frequency, on the other hand, the communication interface 112 maintains the second frequency. The subsequent process performed by the communication interface 112 to compare the fourth frequency with the second frequency is the same as described above, and a description thereof is omitted.

Further, when the accessory power supply (ACC) of the vehicle 1 is turned off, the communication interface 112 causes the storage 120 to store the information on the frequency of the communication rate and the frequency change flag. Further, when the ACC of the vehicle 1 is turned on, the communication interface 112 reads the information on the frequency of the communication rate and the frequency change flag from the storage 120 and uses the information.

The features are implemented in hardware such as a central processing unit (CPU), a memory, or other large scale integration (LSI) of an arbitrary computer and in software such as a program loaded into a memory. The figure depicts functional blocks implemented by the cooperation of these elements. Therefore, it will be understood by those skilled in the art that the functional blocks may be implemented in a variety of manners by hardware only or by a combination of hardware and software.

Figure 6:
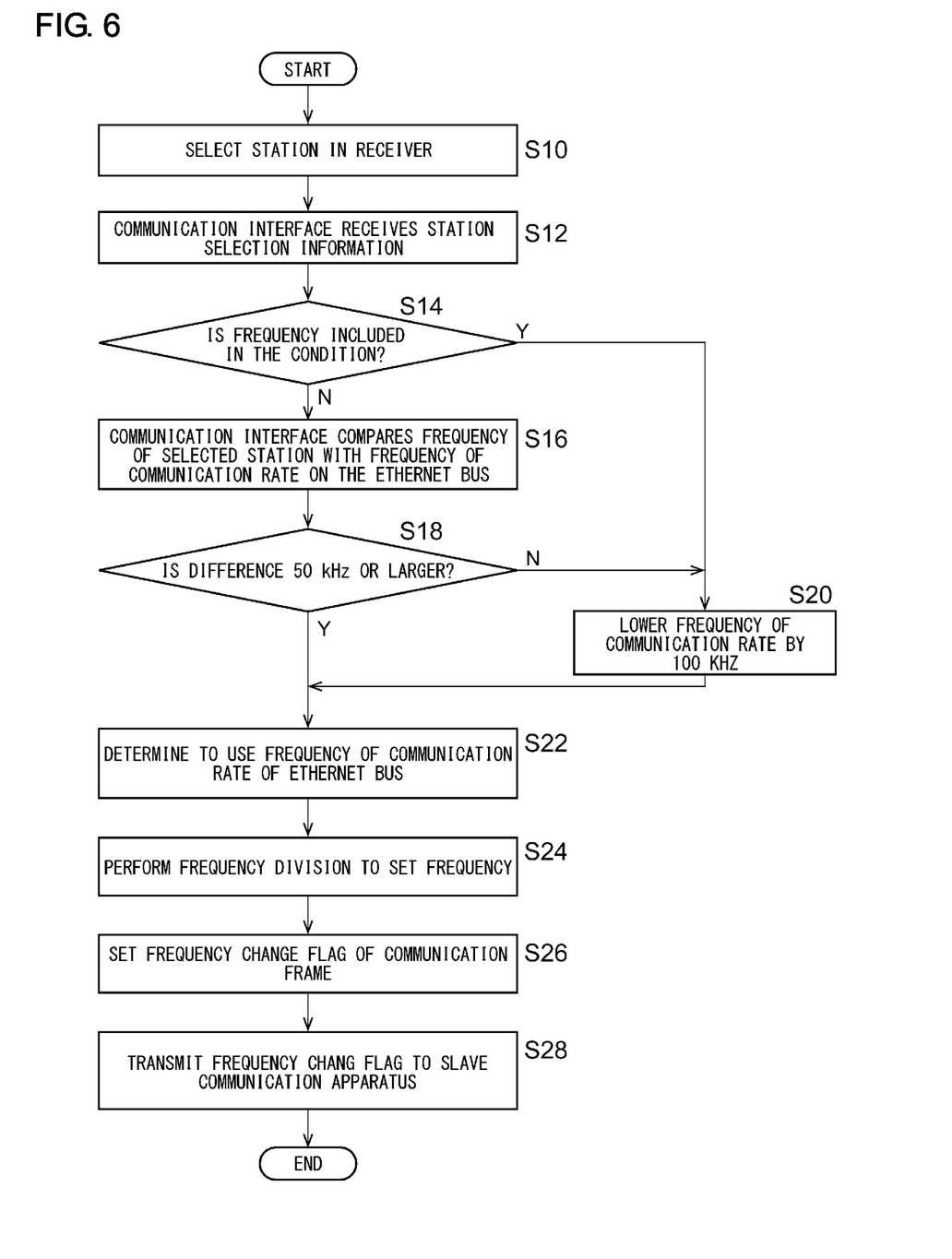
FIG. 6 is a flowchart showing a sequence of steps performed by the master communication apparatus of FIG. 2.

A description will now be given of the operation of the communication system 1000 having a configuration described above. FIG. 6 is a flowchart showing a sequence of steps performed by the master communication apparatus 100. The receiver 130 selects a station (S10). The communication interface 112 receives station selection information (S12). When the frequency included in the station selection information is not a frequency included in the condition (N in S14), the communication interface 112 compares the frequency of the selected station with the frequency of the communication rate on the Ethernet (registered trademark) Bus (S16). When the difference is 50 kHz or larger (Y in S18), the communication interface 112 determines to maintain the current frequency of the communication rate (S22).

When the frequency included in the station selection information is a frequency included in the condition (Y in S14), or when the difference is not equal to or larger than 50 kHz (N in S18), the communication interface 112 lowers the frequency of the communication rate by 100 kHz (S20). The communication interface 112 determines to use the frequency derived by lowering the frequency of the communication rate of the Ethernet (registered trademark) Bus by 100 kHz (S22). The oscillator 114 performs frequency division to set the determined frequency (S24). The communication interface 112 sets a frequency change flag of the communication frame (S26). The communication interface 112 transmits the frequency change flag to the slave communication apparatus 200 (S28).

Figure 7:
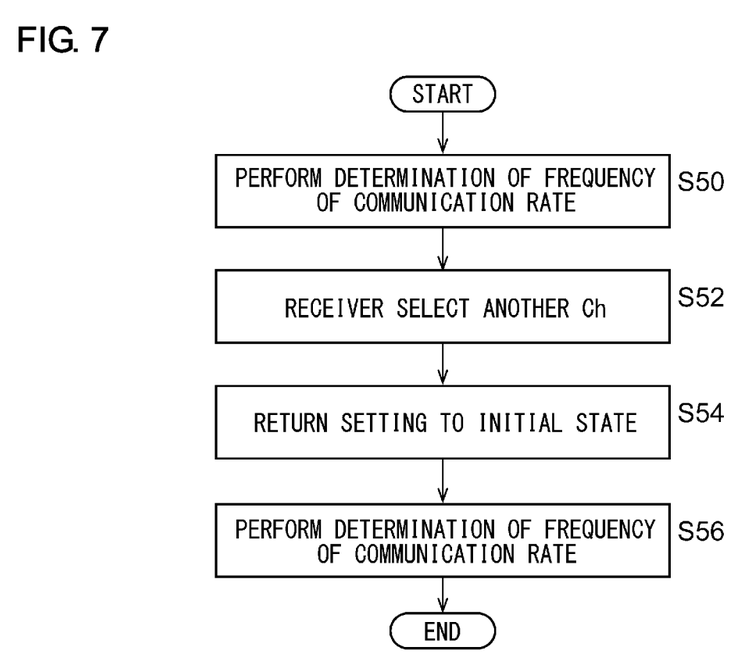
FIG. 7 is a flowchart showing another sequence of steps performed by the master communication apparatus of FIG. 2.

FIG. 7 is a flowchart showing another sequence of steps performed by the master communication apparatus 100. The communication interface 112 performs the step of determining the frequency of the communication rate (S50). The receiver 130 selects another channel (S52). The communication interface 112 returns the setting to the initial state (S54). The communication interface 112 performs the step of determining the frequency of the communication rate (S56).

Figure 8:
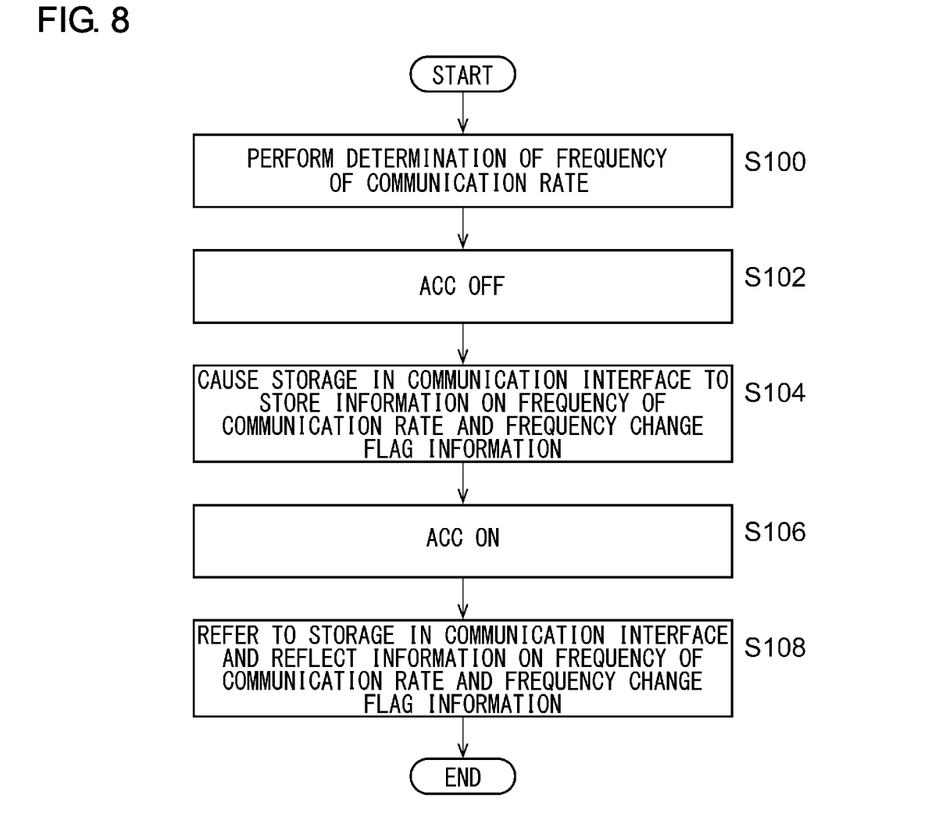
FIG. 8 is a flowchart showing still another sequence of steps performed by the master communication apparatus of FIG. 2.

FIG. 8 is a flowchart showing still another sequence of steps performed by the master communication apparatus 100. The communication interface 112 performs the step of determining the frequency of the communication rate (S100). ACC is turned off (S102). The communication interface 112 causes the storage 120 to store information on the frequency of the communication rate and frequency change flag information (S104). ACC is turned on (S106). The communication interface 112 refers to the storage 120 and reflects the information on the frequency of the communication rate and the frequency change flag information in the current setting (S108).

According to the embodiment, the frequency of the communication rate is changed when the frequency of the selected station and the frequency of the communication rate are near so that the impact on the reception of broadcast is suppressed. Further, the communication interface determines to change the frequency of the communication rate so that it is possible to counter the noise only by means of the communication interface instead of the first device as a whole. Further, change information is transmitted when the frequency of the communication rate is changed so that the frequency of the communication rate in the slave communication apparatus is prevented from being changed. Further, the frequency of the communication rate in the slave communication apparatus is prevented from being changed so that the impact on the reception of broadcast is suppressed. Further, generation of the noise due to a change in the frequency of the communication rate in the slave communication apparatus is suppressed.

Further, the frequency of the communication rate is changed by an amount equal to or greater than the separation between adjacent channels when the separation between the frequency of the selected station and the frequency of the communication rate is smaller than the separation between adjacent channels. Accordingly, the impact of the frequency of the communication rate on the frequency of the selected station is suppressed. Further, the communication rate is finely regulated so that the constraint on the communication capacity is avoided. Further, the impact on the reception of broadcast is suppressed in the case the separation between adjacent channels is 100 kHz. Further, since the frequency of the communication rate is changed based on a condition, the period of time required for the changing process is reduced. Further, when the information on the frequency of a newly selected station is received, the frequency of the newly selected station and the frequency of the communication rate are compared so that the impact on the reception of broadcast is suppressed.

One embodiment of the present disclosure is summarized below. A communication apparatus according to an embodiment of the present disclosure is a master communication apparatus communicating with a slave communication apparatus and includes a communication interface that communicates with the slave communication apparatus and a receiving interface that receives information on a first frequency of a station selected by a receiver of broadcast. When a difference between the first frequency included in the information received by the receiving interface and a second frequency of a communication rate used in communication with the slave communication apparatus is smaller than a threshold value, the communication interface changes the communication rate to a third frequency different from the second frequency. When the communication interface changes the communication rate from the second frequency to the third frequency, the communication interface transmits change information indicating a change to the third frequency to the slave communication apparatus.

According to the embodiment, the frequency of the communication rate is changed and change information is transmitted when the frequency of the selected station and the frequency of the communication rate are near. Therefore, the impact on the reception of broadcast is suppressed.

The threshold value in the communication interface may be smaller than a separation between adjacent channels in the broadcast, and a difference between the second frequency and the third frequency used in the communication interface may be equal to or larger than the separation between adjacent channels in the broadcast. In this case, the frequency of the communication rate is changed by an amount equal to or larger than the separation between adjacent channels when the difference between the frequency of the selected station and the frequency of the communication rate is smaller than the separation between adjacent channels. Therefore, the impact of the frequency of the communication rate on the frequency of the selected station is suppressed.

The separation between adjacent channels in the broadcast is 100 kHz, the threshold value in the communication interface is 50 kHz, and the third frequency used in the communication interface is lower than the second frequency by 100 kHz. In this case, the impact on the reception of broadcast is suppressed in the case the separation between adjacent channels is 100 kHz.

The separation between adjacent channels in the broadcast is 200 kHz, the threshold value in the communication interface is 100 kHz, and the third frequency used in the communication interface is lower than the second frequency by 200 kHz. In this case, the impact on the reception of broadcast is suppressed in the case the separation between adjacent channels is 200 kHz.

The communication interface may store a condition according to which the communication rate should be changed from the second frequency to the third frequency, and, when the first frequency included in the information received by the receiving interface is included in the condition stored, the communication interface may change the communication rate to the third frequency. In this case, the frequency of the communication rate is changed based on the condition so that the period of time required for the changing process is reduced.

When the receiving interface receives information on a fourth frequency of a station selected by the receiver of broadcast different from the first frequency, the communication interface may return the communication rate to the second frequency and compare the fourth frequency with the second frequency. In this case, when the information on the frequency of a newly selected station is received, the frequency of the newly selected station and the frequency of the communication rate are compared so that the impact on the reception of broadcast is suppressed.

Another embodiment of the present disclosure relates to a communication system. The communication system includes a master communication apparatus and a slave communication apparatus that communicates with the master communication apparatus. The master communication apparatus includes: a communication interface that communicates with the slave communication apparatus; and a receiving interface that receives information on a first frequency of a station selected by a receiver of broadcast. When a difference between the first frequency included in the information received by the receiving interface and a second frequency of a communication rate used in communication with the slave communication apparatus is smaller than a threshold value, the communication interface changes the communication rate to a third frequency different from the second frequency. When the communication interface changes the communication rate from the second frequency to the third frequency, the communication interface transmits change information indicating a change to the third frequency to the slave communication apparatus, and, when the slave communication apparatus receives the change information from the master communication apparatus, the slave communication apparatus uses the third frequency of the communication rate.

Described above is an explanation based on an exemplary embodiment. The embodiment is intended to be illustrative only and it will be understood by those skilled in the art that various modifications to constituting elements and processes could be developed and that such modifications are also within the scope of the present invention.

In the embodiment, the separation between adjacent channels is defined to be 100 kHz. However, the embodiment is non-limiting as to the separation, and the separation between adjacent channels may be 200 kHz. In that case, the threshold value is set to be 100 kHz, and the third frequency is set to be lower than the second frequency by 200 kHz. According to this variation, the impact on the reception of broadcast is suppressed in the case the separation between adjacent channels is 200 kHz.

While various embodiments have been described herein above, it is to be appreciated that various changes in form and detail may be made without departing from the spirit and scope of the invention(s) presently or hereafter claimed.

CROSS-REFERENCE TO RELATED APPLICATION

This application is based upon and claims the benefit of priority from the prior Japanese Patent Application No. 2020-006822, filed on Jan. 20, 2020, the entire contents of which are incorporated herein by reference.

What is claimed is:

1. A communication apparatus that is a master communication apparatus communicating with a slave communication apparatus, the communication apparatus comprising:
    a communication interface that communicates with the slave communication apparatus; and
    a receiving interface that receives information on a first frequency of a station selected by a receiver of broadcast, wherein
    when a difference between the first frequency included in the information received by the receiving interface and a second frequency of a communication rate used in communication with the slave communication apparatus is smaller than a threshold value, the communication interface changes the communication rate to a third frequency different from the second frequency,
    when the communication interface changes the communication rate from the second frequency to the third frequency, the communication interface transmits change information indicating a change to the third frequency to the slave communication apparatus,
    the threshold value in the communication interface is smaller than a separation between adjacent channels in the broadcast, and
    a difference between the second frequency and the third frequency used in the communication interface is equal to or larger than the separation between adjacent channels in the broadcast.

2. The communication apparatus according to claim 1, wherein
    the separation between adjacent channels in the broadcast is 100 kHz,
    the threshold value in the communication interface is 50 kHz, and
    the third frequency used in the communication interface is lower than the second frequency by 100 kHz.

3. The communication apparatus according to claim 2, wherein
the communication interface stores a condition according to which the communication rate should be changed from the second frequency to the third frequency,
when the first frequency included in the information received by the receiving interface is included in the condition stored, the communication interface changes the communication rate to the third frequency.

4. The communication apparatus according to claim 3, wherein
when the receiving interface receives information on a fourth frequency of a station selected by the receiver of broadcast different from the first frequency, the communication interface returns the communication rate to the second frequency and compares the fourth frequency with the second frequency.

5. The communication apparatus according to claim 2, wherein
when the receiving interface receives information on a fourth frequency of a station selected by the receiver of broadcast different from the first frequency, the communication interface returns the communication rate to the second frequency and compares the fourth frequency with the second frequency.

6. The communication apparatus according to claim 1, wherein
the separation between adjacent channels in the broadcast is 200 kHz,
the threshold value in the communication interface is 100 kHz, and
the third frequency used in the communication interface is lower than the second frequency by 200 kHz.

7. The communication apparatus according to claim 6, wherein
the communication interface stores a condition according to which the communication rate should be changed from the second frequency to the third frequency,
when the first frequency included in the information received by the receiving interface is included in the condition stored, the communication interface changes the communication rate to the third frequency.

8. The communication apparatus according to claim 7, wherein
when the receiving interface receives information on a fourth frequency of a station selected by the receiver of broadcast different from the first frequency, the communication interface returns the communication rate to the second frequency and compares the fourth frequency with the second frequency.

9. The communication apparatus according to claim 6, wherein
when the receiving interface receives information on a fourth frequency of a station selected by the receiver of broadcast different from the first frequency, the communication interface returns the communication rate to the second frequency and compares the fourth frequency with the second frequency.

10. The communication apparatus according to claim 1, wherein
the communication interface stores a condition according to which the communication rate should be changed from the second frequency to the third frequency,
when the first frequency included in the information received by the receiving interface is included in the condition stored, the communication interface changes the communication rate to the third frequency.

11. The communication apparatus according to claim 10, wherein
when the receiving interface receives information on a fourth frequency of a station selected by the receiver of broadcast different from the first frequency, the communication interface returns the communication rate to the second frequency and compares the fourth frequency with the second frequency.

12. The communication apparatus according to claim 1, wherein
when the receiving interface receives information on a fourth frequency of a station selected by the receiver of broadcast different from the first frequency, the communication interface returns the communication rate to the second frequency and compares the fourth frequency with the second frequency.

13. A communication system comprising:
a master communication apparatus; and
a slave communication apparatus that communicates with the master communication apparatus, wherein
the master communication apparatus includes:
a communication interface that communicates with the slave communication apparatus; and
a receiving interface that receives information on a first frequency of a station selected by a receiver of broadcast, wherein
when a difference between the first frequency included in the information received by the receiving interface and a second frequency of a communication rate used in communication with the slave communication apparatus is smaller than a threshold value, the communication interface changes the communication rate to a third frequency different from the second frequency,
when the communication interface changes the communication rate from the second frequency to the third frequency, the communication interface transmits change information indicating a change to the third frequency to the slave communication apparatus,
when the slave communication apparatus receives the change information from the master communication apparatus, the slave communication apparatus uses the third frequency of the communication rate,
the threshold value in the communication interface is smaller than a separation between adjacent channels in the broadcast, and
a difference between the second frequency and the third frequency used in the communication interface is equal to or larger than the separation between adjacent channels in the broadcast.

* * * * *